No. 748,907. PATENTED JAN. 5, 1904.
R. ZIEGENBERG.
ELECTRIC DYNAMO OR MOTOR WITH ALTERNATING FIELD.
APPLICATION FILED APR. 25, 1903.
NO MODEL.
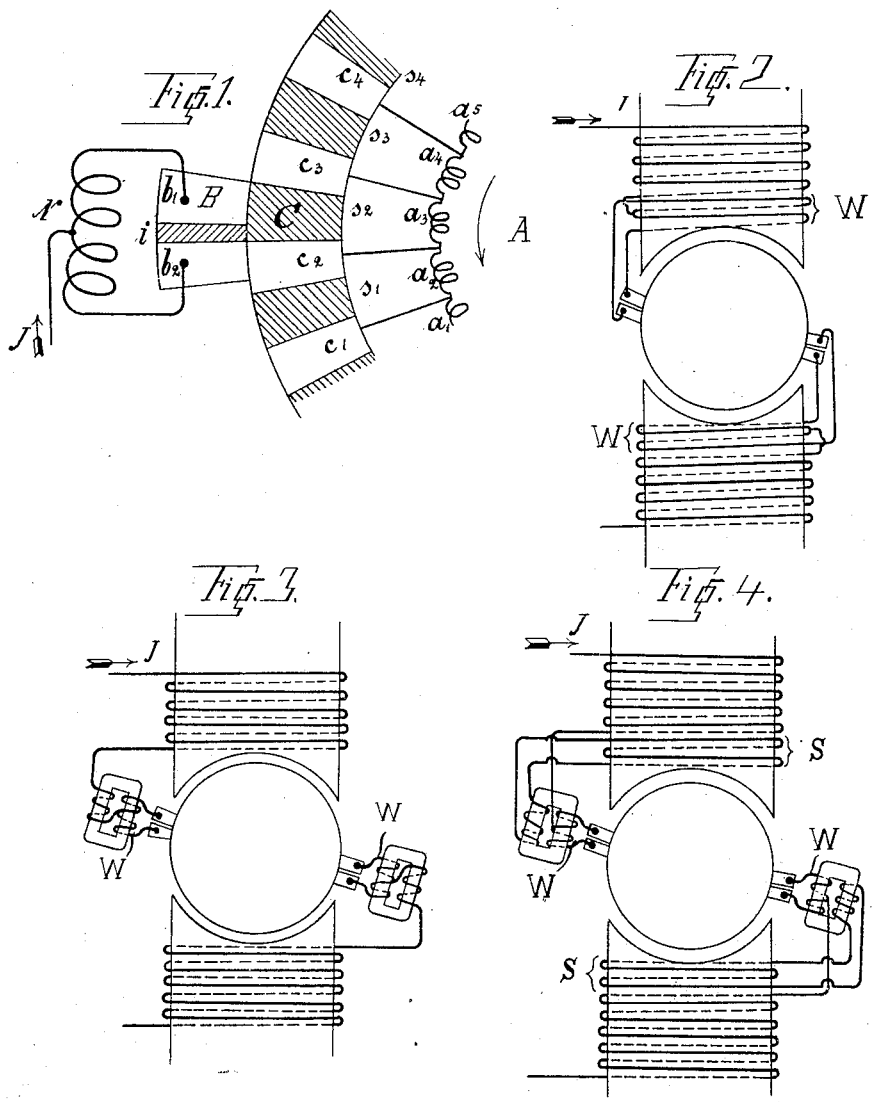

No. 748,907. Patented January 5, 1904.

UNITED STATES PATENT OFFICE.

RUDOLF ZIEGENBERG, OF SCHÖNEBERG, NEAR BERLIN, GERMANY.

ELECTRIC DYNAMO OR MOTOR WITH ALTERNATING FIELD.

SPECIFICATION forming part of Letters Patent No. 748,907, dated January 5, 1904.

Application filed April 25, 1903. Serial No. 154,361. (No model.)

*To all whom it may concern:*

Be it known that I, RUDOLF ZIEGENBERG, a subject of the German Emperor, residing at Schöneberg, near Berlin, Germany, have invented certain new and useful Improvements in and Relating to Electric Dynamos or Motors with Alternating Field, of which the following is a specification.

Alternating-current machines, both dynamos and motors, can be divided into two main classes—namely, those in which the field is produced by direct currents and those in which it is produced by alternating currents. It may be here mentioned that the so-called "asynchronous alternating-current machines" hitherto known, mostly with inductively-excited fields, will be reckoned of the former class, since in these the field is excited by alternating currents proportional to the slip and continuously tends to synchronize, the frequency of the exciting currents becoming less, and with asynchronous working and conductive excitation, as in the Gorges machine and more lately in the Heyland motor, the alternating current becomes, in fact, a direct current. As coming under the second heading only those machines are understood in which the excitation takes place by alternating currents at full frequency, and it is this group of machines which I shall refer to as "alternating-field" machines. These machines are similar to direct-current commutating-machines with the only essential difference that the field is subdivided, which is not usually the case in direct-current machines. As already indicated, the machines are provided with commutators, and therefore as regards simplicity not equal to ordinary alternators excited by direct current. For generating alternating currents they will therefore hardly come in question; but it is different as regards motors. In the latter capacity the alternating-field machine, more particularly when series wound, has two features which give it an advantage over other alternating-current motors, more particularly single-phase motors. It starts with full torque and is completely asynchronous—that is to say, capable of the same regulation as regards speed as a direct-current motor. The principal reason why these machines have not hitherto come into practical use is the excessive sparking to which they are subject and which rapidly destroys the collector or armature. The cause of this sparking is not the same as that which produces sparking in direct-current machines, and cannot, therefore, be obviated by the means employed for that purpose in direct-current motors.

The object of my invention is to prevent this sparking or to reduce it to the moderate proportions existing in direct-current machines.

The cause of the excessive sparking in alternating-field machines is not only self-induction in the coils short-circuited by the brushes, but also the much higher electromotive force generated in the short-circuited coil on the ring-armature by half the magnetic flux of a field alternating at the rate of the full periodicity of the current. The field here acts as the primary system of a transformer and the two coils short-circuited by the brushes as the secondary system thereof. This direct inductive action of the field on the armature, which shall for simplicity be called the "transformer" action, does not apply to the other armature-coils, since in the quadrants forming one-half of the armature on either side of the line connecting the brushes the induction is equal and opposite and the resultant effect therefore *nil*. In the coils short-circuited by the brushes, however, induction can develop in full force and is there most strongly, since at the brushes the coils link the largest number of lines. To prevent the generation of this electromotive force is impossible, since it is closely related to the principle of the machine. To render it smaller, the armature can be divided into a large number of sections, so that each coil has a small number of turns; but since the resistance is by this means also reduced and the self-induction increased the effect is not very marked apart from the more complicated construction of the machine. The electromotive force induced in the short-circuited coils by the transformer action can, however, be counteracted by an electromotive force of the same value in phase with it. This counteracting electromotive force cannot be generated in the same short-circuited coil, since to do so would require an auxiliary field of the same strength as that of the machine, but of opposite direction, so that in neutralizing the effect of the electromotive force the output of the machine would be rendered *nil* by the opposite and equal torque due to the auxiliary field. There are, however, other means of applying the counter electromotive force—namely, by the use of a divided brush and a commutator of special construction.

In the annexed drawings, Figures 1 to 4 are diagrams illustrating the invention.

In Fig. 1, A represents part of the ring-armature, and C the corresponding part of the commutator. The commutator-segments $c'$ $c^2$ $c^3$ $c^4$ and the insulators $s'$ $s^2$ $s^3$ $s^4$ between them are of equal breadth. The divided brush B in contact with this part of the commutator consists of two parts $b'$ $b^2$, insulated from each other by a wall $i$, each of the parts $b'$ $b^2$ plus the insulating-wall $i$ being equal in breadth to one of the segments $c$ or $s$. If the load-current is supplied to the two conducting parts of the brush in parallel, the conductive contact-surface between the brush and commutator—that is to say, the resistance between them—will always be the same whatever the position of the commutator. Equal or unequal portions of the two parts $b'$ $b^2$ may be in contact with two contact-segments or one of the said parts may be entirely short-circuited and the other part in contact with a segment $c$; but neither of the parts $b'$ $b^2$ can ever be simultaneously in contact with two of the contact-segments.

The parts $b'$ and $b^2$ are connected to a coil N, consisting of a small number of turns and joined at its center to the outer circuit J. If an electromotive force is generated in this coil equivalent to and in phase with or differing by one hundred and eighty degrees from the electromotive force generated by transformer action at the moment of commutation, the latter electromotive force will be neutralized, and the chief cause of excessive sparking thus removed. Commutation then takes place under the same conditions as in a continuous-current machine.

The auxiliary electromotive force referred to can be generated in various ways. It is obvious that an electromotive force in phase with that generated by transformer action in the short-circuited coil will be obtained by using a few coils W, Fig. 2, on the field-magnet. The required value can be obtained by regulating the number and size of the turns.

Instead of using coils W placed round the entire field-magnet, coils can be wound on a small projection of the magnet provided for the purpose, and it is not absolutely essential that the wire J should be joined to the center of the coil F; but it is only preferable for the sake of symmetry. A comparatively strong field is preferably used for generating the auxiliary electromotive force in order that a small number of turns W will be sufficient, since the coil W, equivalent to the coil N in Fig. 1, carries at times half and at times the entire load-current, and it is desirable to avoid useless resistance in the circuit.

In order to dispense with the thick connections from the auxiliary coils to the brushes, a small transformer can be mechanically connected to each brush. In this case the coil N of Fig. 1 receiving the load-current at its center is the secondary coil. The primary coil is shown in Fig. 3 in series with the circuit and in Fig. 4 joined to a coil S on the field-magnet. In the latter case the load-current could be led directly to the brush and the primary coil of the small transformer need only be connected to the auxiliary coil by a fine wire.

Instead of constructing the brush B so that the parts $b'$ and $b^2$ are adapted to be simultaneously in contact with two successive contact-segments C the insulating-bar can be made so broad that the said parts $b'$ and $b^2$ can be simultaneously in contact with two segments between which one segment is missed. In this case it is unnecessary to have a commutator with insulating-segments of the same breadth as the copper or gun-metal segments. An ordinary commutator, as for direct-current machines, will be used, with its segments insulated from each other by very thin sheets of mica or the like. Alternate segments—for instance, those with even numbers—are then connected to the armature-sections and the segments with odd numbers, insulated on both sides from the others, take the place of the broad insulating-segments $s'$ $s^2$, &c. As already stated, however, the two parts of the brush must in this case not be constructed to contact with successive segments connected to the armature, since otherwise conductive connection would be made by the metal segment between the said bars.

I declare that what I claim is—

1. In an alternating-field electric machine, the combination with the field-magnets, an armature comprising coils and a commutator having its segments connected to and common to successive coils, a double brush coöperating with said segments and having its two parts electrically connected and means interposed in said electric connection for producing an electromotive force equivalent to and differing in phase by one hundred and eighty degrees from the electromotive force generated in the short-circuited coil by transformer action so that the said electromotive forces balance each other in the said coil.

2. In an alternating-field electric machine, the combination with the field-magnets, an armature comprising coils and a commutator having its segments connected to and common to successive coils, of a commutator-brush comprising two insulated segments adapted to have contact severally with successive contact-segments of the commutator, a coil connecting said brush-segments and means for inducing in said coil an electromotive force equivalent to and differing in phase by one hundred and eighty degrees from the electromotive force generated in the short-circuited coil by transformer action so that the said electromotive forces balance each other in the said coil.

3. In an alternating-field electric machine, the combination with the field-magnets, an armature comprising coils and a commutator having its segments connected to and common to successive coils, of a commutator-brush comprising two insulated segments adapted to have contact severally with successive contact-segments of the commutator, a coil connecting said brush-segments, and connected intermediately of its ends to the load-current lead, and means for inducing in said coil an electromotive force equivalent to and differing in phase by one hundred and eighty degrees from the electromotive force generated in the short-circuited coil by transformer action so that the said electromotive forces balance each other in the said coil.

In witness whereof I have signed this specification in the presence of two witnesses.

RUDOLF ZIEGENBERG.

Witnesses:
HEINRICH TROOST,
CURT TROMPLER.